(12) United States Patent
Miller et al.

(10) Patent No.: US 8,381,078 B2
(45) Date of Patent: Feb. 19, 2013

(54) MULTI-CHANNEL STATISTICAL MULTIPLEXING OF FEC DECODERS

(75) Inventors: Mark J. Miller, Vista, CA (US); Sanford Leong, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 260 days.

(21) Appl. No.: 12/832,837

(22) Filed: Jul. 8, 2010

(65) Prior Publication Data

US 2011/0167313 A1 Jul. 7, 2011

Related U.S. Application Data

(60) Provisional application No. 61/224,455, filed on Jul. 9, 2009.

(51) Int. Cl.
  *G06F 11/00* (2006.01)
(52) U.S. Cl. ......................... 714/776; 714/758
(58) Field of Classification Search .................. 714/776, 714/791–796, 758, 752, 761
See application file for complete search history.

(56) References Cited

U.S. PATENT DOCUMENTS

| | | | | |
|---|---|---|---|---|
| 5,717,394 A | * | 2/1998 | Schwartz et al. | 341/51 |
| 6,928,603 B1 | * | 8/2005 | Castagna et al. | 714/786 |
| 7,383,486 B1 | * | 6/2008 | Castagna et al. | 714/786 |
| 7,458,008 B2 | * | 11/2008 | Wang et al. | 714/796 |
| 7,609,626 B2 | * | 10/2009 | Wang et al. | 370/229 |

* cited by examiner

*Primary Examiner* — Dieu-Minh Le
(74) *Attorney, Agent, or Firm* — Kilpatrick Townsend & Stockton LLP

(57) ABSTRACT

A method for dividing a total number of decoders among decoder queues of codewords of different sizes, the codewords transmitted on return communication links from data terminals to a gateway of a satellite communications system, includes for each of K groups, allocating a respective number of decoders dedicated to decoding codewords of a particular size, where K is a number of different sizes of codewords, and the respective number of decoders is allocated from the total number of decoders and allocated in proportion to current offered load of codewords of the particular size.

22 Claims, 6 Drawing Sheets

Bank of receivers servicing multiple return link channels

One decoder queue for each of K block sizes $N_{dec}$ decoders to be allocated to $K$ Queues

US 8,381,078 B2

MULTI-CHANNEL STATISTICAL MULTIPLEXING OF FEC DECODERS

CROSS REFERENCES TO RELATED APPLICATIONS

The present application claims benefit of priority under 35 U.S.C. 119(e) of U.S. Provisional Application No. 61/224,455, filed on Jul. 9, 2009, entitled "MULTI-CHANNEL STATISTICAL MULTIPLEXING OF FEC DECODERS," the entirety of which is herein incorporated by reference for all purposes.

FIELD OF THE INVENTION

The present invention relates generally to satellite communications systems. More particularly, the present invention relates to methods and apparatuses for distributing Forward Error Correction decoders among decoder queues for codewords of different block sizes in satellite communications systems.

BACKGROUND

The next generation of commercial high capacity $K_a$ frequency band (i.e., 26.5-40 GHz) satellite-based broadband systems promise high data rates for the end user at a low cost. These systems typically use multiple gateway terminals to communicate with a large number of user terminals, with the satellite between the gateway terminal and the user terminals. A forward link of a satellite communications system may consist of forward uplink transmissions from a gateway terminal to a satellite, a "bent pipe" repeater at the satellite, and forward downlink transmissions to a group of user terminals located in a common spot beam. A return link of a satellite communications system may consist of return uplink transmissions from user terminals in a common spot beam to a satellite, and return downlink transmissions from the satellite to a gateway terminal servicing the spot beam.

It is well known that in order to ensure reliable data transmission, Forward Error Correction (FEC) is used in such systems. On the bursty return link, various user terminals transmit bursts of data of various sizes. A burst is defined as a contiguous radio frequency transmission from an individual user terminal. Each burst can include one or more codewords, where a codeword is defined as an individual decodable FEC block. The sizes of these codewords can be as short as a few bytes (e.g., 32 bytes) to as long as multiple kilobytes (e.g., 8192 bytes). The particular FEC scheme employed could vary from system to system, but typical modern systems use FEC schemes that require complicated iterative decoders. Examples of such FEC schemes include turbo codes and low-density parity-check (LDPC) codes.

The FEC decoders for the return link can be in a physical layer (PHY) processing subsystem located in the gateway. Each PHY processing subsystem typically processes a fixed amount of bandwidth (e.g., 62.5 MHz or 125 MHz), which can include multiple return link channels. Thus, each PHY processing subsystem can be responsible for decoding bursts transmitted on these multiple return link channels. Typically, each decoder is dedicated for the decoding of a respective return link channel. As a result, processing of a codeword transmitted on a particular return link channel does not begin until the respective decoder is available, even if all the other decoders of that PHY processing subsystem are available. This can happen quite often for Time Division Multiple Access (TDMA) systems, where burst assignments are not deterministic. The result can be an undesirably high latency for processing codewords. A variation on a TDMA system is a Multi-Frequency TDMA (MF-TDMA) system, where each user could be made to hop across different frequency channels on a burst-by-burst basis.

The number of FEC decoders in each PHY processing subsystem is an important design decision. These decoders are typically fairly complicated and thus utilize a significant amount of hardware and/or software resources. These decoders can be implemented, for example, as Field Programmable Gate Arrays (FPGAs), Application Specific Integrated Circuits (ASICs), or some other hardware/software components (e.g., microprocessors). Thus, minimizing the number of decoders needed in each PHY processing subsystem is important in the design of small, efficient, and less expensive gateway terminals.

The FEC decoders employed in most modern systems are iterative decoders. Iterative decoders process the same codeword one or more times in an iterative manner, where each iteration generally moves the codeword closer to being decoded correctly. The number of iterations needed to decode a codeword correctly is a random variable and cannot be predicted a priori. Even though most codewords might need a relatively small number of iterations before being decoded correctly, some codewords might need a large number of iterations before being decoded correctly. There may be other codewords that will not decode correctly even after reaching a maximum number of iterations. The number of iterations needed to decode a particular codeword affects the amount of time that the decoder spends on the particular codeword and thus, the number of decoders needed to decode a particular rate of incoming bursts.

Some applications, such as Voice over Internet Protocol (VoIP), are less tolerant to latency and jitter (i.e., variability in the decoding time needed) and are generally transmitted as short codewords. Typically, longer codewords take longer to decode than shorter codewords take to decode. Thus, if a short codeword follows a long codeword, processing of the long codeword can introduce further latency to processing of the shorter codeword.

SUMMARY

An example of a method for dividing a total number of decoders among decoder queues of codewords of different sizes, the codewords transmitted on return communication links from data terminals to a gateway of a satellite communications system, according to the disclosure includes: for each of K groups, allocating a respective number of decoders dedicated to decoding codewords of a particular size, where K is a number of different sizes of codewords, and the respective number of decoders is allocated from the total number of decoders and allocated in proportion to current offered load of codewords of the particular size.

Embodiments of such a method may include one or more of the following features. The method further includes allocating a minimum number of decoders to each of the K groups, where each of the respective number of decoders dedicated to decoding codewords of a particular size is greater than or equal to the minimum number of decoders allocated to each of the K groups. The method further includes calculating the respective current offered load for each of the K number of different sizes of codewords. Calculating the respective current offered load of codewords of a particular size includes calculating the respective current offered load as a function of average iteration rate for codewords of the particular size, number of symbols processed per codeword of the particular size, and processing rate of the decoders dedicated to decoding codewords of the particular size. The method further includes applying a correction factor to each of one or more of the respective number of decoders dedicated to decoding codewords of a particular size to correct for one or more of queuing statistics and queuing model. The method further includes normalizing and quantizing each of the K respective number of decoders dedicated to decoding codewords of a particular size. The method further includes calculating a utilization value for each of the K number of different sizes of codewords; and allocating a number of unallocated decoders to one or more of the K groups based on the calculated utilization values.

An example of a method for decoding codewords of different sizes, the codewords transmitted on return communication links from data terminals to a gateway of a satellite communications system, includes: determining a size of a codeword; determining a particular decoding queue for decoding the codeword based on the determined size of the codeword, the particular decoding queue being one of K decoding queues, where K is a number of different sizes of codewords; and decoding the codeword using a decoder of the particular decoding queue, where the number of decoders in the particular decoding queue is allocated in proportion to current offered load of codewords of the determined size.

Embodiments of such a method may include one or more of the following features. Decoding the codeword includes iteratively decoding the codeword including determining after each decoding iteration if a cyclic redundancy check associated with the codeword passes. Iteratively decoding the codeword includes iteratively decoding the codeword until a maximum number of iterations is reached or the cyclic redundancy check associated with the codeword passes for a threshold number of consecutive iterations. One or more of the following varies based on the determined size of the codeword: a size of the cyclic redundancy check associated with the codeword, the maximum number of iterations, and the threshold number of consecutive iterations. The method further includes detecting presence of a data burst during a transmission time assigned to a data terminal of the satellite communications system, where determining the size of the codeword includes determining the size of the codeword included in the data burst. The method further includes determining that the data burst is a dummy burst transmitted by the data terminal during the assigned transmission time, where the dummy burst does not include codewords.

An example of an apparatus for dividing a total number of decoders among decoder queues of codewords of different sizes, the codewords transmitted on return communication links from data terminals to a gateway of a satellite communications system, includes: an allocation module configured to allocate, for each of K groups, a respective number of decoders dedicated to decoding codewords of a particular size, where K is a number of different sizes of codewords, and the respective number of decoders is allocated from the total number of decoders and allocated in proportion to current offered load of codewords of the particular size.

Embodiments of such an apparatus may include one or more of the following features. The apparatus further includes a calculation module communicatively coupled to the allocation module and configured to calculate the respective current offered load for each of the K number of different sizes of codewords. The allocation module is further configured to apply a correction factor to each of one or more of the respective number of decoders dedicated to decoding codewords of a particular size to correct for one or more of queuing statistics and queuing model. The allocation module is further configured to normalize and quantize each of the K respective number of decoders dedicated to decoding codewords of a particular size. The apparatus further includes a calculation module communicatively coupled to the allocation module and configured to calculate a utilization value for each of the K number of different sizes of codewords, wherein the allocation module is further configured to allocate a number of unallocated decoders to one or more of the K groups based on the calculated utilization values.

An example of an apparatus for decoding codewords of different sizes, the codewords transmitted on return communication links from data terminals to a gateway of a satellite communications system, includes: a processor configured to determine a size of a codeword, and determine a particular decoding queue for decoding the codeword based on the determined size of the codeword, the particular decoding queue being one of K decoding queues, where K is a number of different sizes of codewords; and a number of decoders in the particular decoding queue, each decoder communicatively coupled to the processor and configured to decode the codeword, where the number of decoders in the particular decoding queue is allocated in proportion to current offered load of codewords of the determined size.

Embodiments of such an apparatus may include one or more of the following features. Each of the decoders is configured to iteratively decode the codeword including determining after each decoding iteration if a cyclic redundancy check associated with the codeword passes. Each of the decoders is configured to iteratively decode the codeword until a maximum number of iterations is reached or the cyclic redundancy check associated with the codeword passes for a threshold number of consecutive iterations. One or more of the following varies based on the determined size of the codeword: a size of the cyclic redundancy check associated with the codeword, the maximum number of iterations, and the threshold number of consecutive iterations.

Numerous benefits are achieved using the present invention over conventional techniques. Multi-channel statistical multiplexing of FEC decoders adapts to the number of iterations needed for each codeword, subject to a maximum number of iterations. Thus, latency is reduced and efficiency is increased when the FEC decoders are allocated dynamically. The described techniques also manage the jitter introduced by these FEC decoders. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

DETAILED DESCRIPTION

The present invention provides improved methods and apparatuses for dividing a total number of decoders among decoder queues of codewords of different sizes, where the codewords are transmitted on return communication links from data terminals (e.g., user terminals) to a gateway of a satellite communications system. For each of K groups, a respective number of decoders dedicated to decoding codewords of a particular size is allocated, where K is a number of different sizes of codewords. The respective number of decoders is allocated from the total number of decoders and allocated in proportion to current offered load of codewords of the particular size. Also described are methods and apparatuses for decoding codewords of different sizes. The size of a codeword is determined, and a particular decoding queue for decoding the codeword is determined based on the determined size of the codeword. The particular decoding queue is one of K decoding queues. The codeword is decoded using a decoder of the particular decoding queue, where the number of decoders in the particular decoding queue is allocated in proportion to current offered load of codewords of the determined size. These and other embodiments of the present invention are described more fully below.

Figure 1:
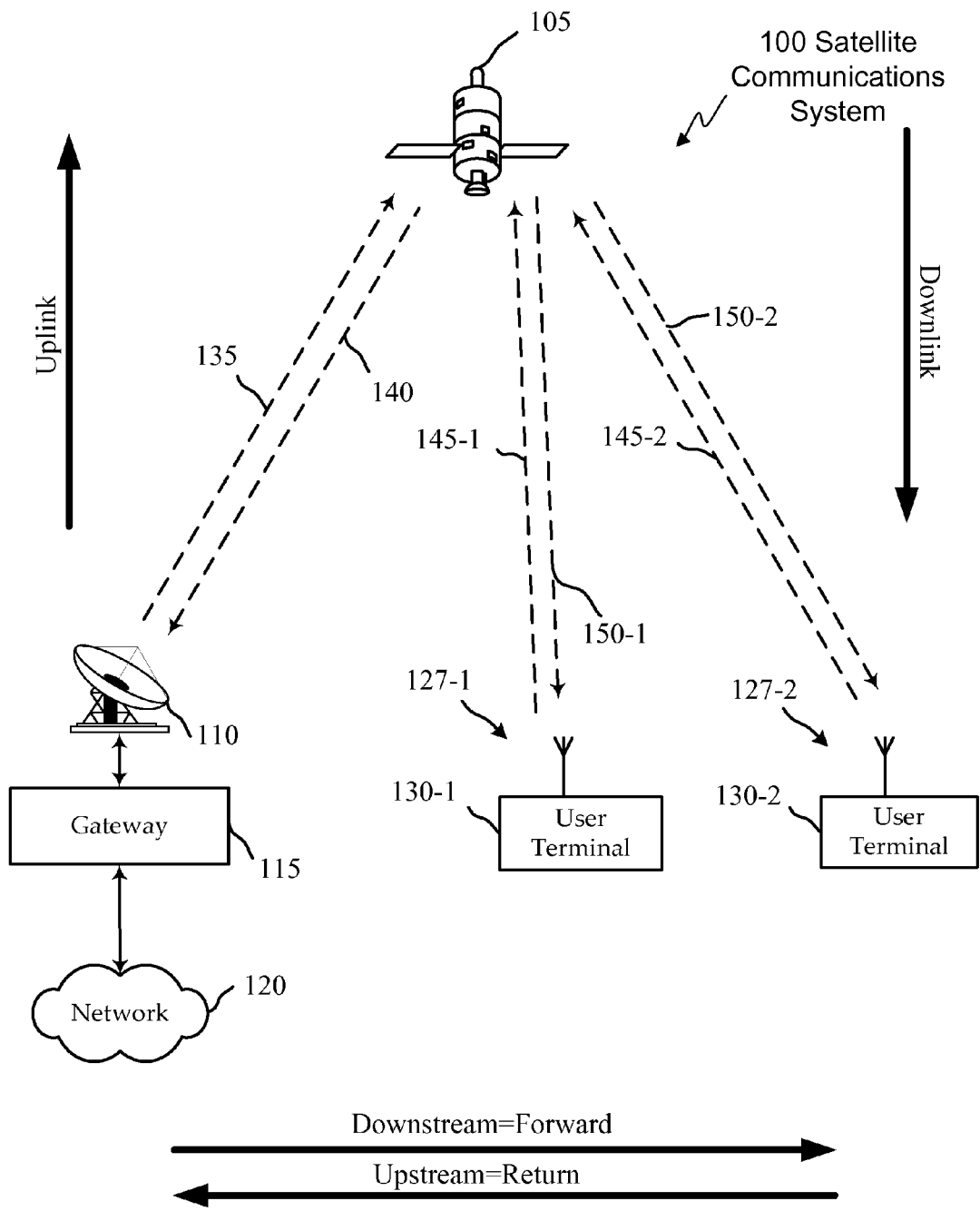
FIG. 1 is a simplified diagram of an exemplary satellite communications system in which the methods and apparatuses of the present invention may be used.

FIG. 1 is a simplified diagram of an exemplary satellite communications system 100 in which the methods of the present invention may be implemented. Satellite communications system 100 includes a network 120 interfaced with one or more gateway terminals 115. The gateway terminal 115 is configured to communicate with one or more user terminals 130 via a satellite 105.

The gateway terminal 115 is sometimes referred to as a hub or ground station. The gateway terminal 115 services uplink 135 and downlink 140 to and from the satellite 105. The gateway terminal 115 may also schedule traffic to the user terminals 130. Alternatively, the scheduling may be performed in other parts of the satellite communications system 100 (e.g., at one or more network operations centers (NOC) and/or gateway command centers). Although only one gateway terminal 115 is shown in FIG. 1, embodiments of the present invention may be implemented in satellite communications systems having a plurality of gateway terminals each of which may be coupled to one or more networks.

In some satellite communications systems, there may be a limited amount of frequency spectrum available for transmission. Communication links between the gateway terminal 115 and the satellite 105 may use the same, overlapping, or different frequencies as communication links between the satellite 105 and the user terminals 130. The gateway terminal 115 may be located remote from the user terminals 130 to enable frequency re-use.

The network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. The network 120 may include both wired and wireless connections as well as optical links. The network 120 may connect the gateway terminal 115 with other gateway terminals that may be in communication with the satellite 105 or with other satellites.

The gateway terminal 115 provides an interface between the network 120 and the satellite 105. The gateway terminal 115 may be configured to receive data and information directed to one or more user terminals 130. The gateway terminal 115 may format the data and information for delivery to the respective user terminals 130. Similarly, the gateway terminal 115 may be configured to receive signals from the satellite 105 (e.g., from one or more user terminals 130) directed to a destination accessible via the network 120. The gateway terminal 115 may format the received signals for transmission on the network 120.

The gateway terminal 115 may use an antenna 110 to transmit a forward uplink signal 135 to the satellite 105. In one embodiment, the antenna 110 may comprise a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, low noise, and the like.

The satellite 105 may be a geostationary satellite that is configured to receive the forward uplink signals 135 from the location of the antenna 110. The satellite 105 may use, for example, a reflector antenna, a lens antenna, a phased array antenna, an active antenna, or any other mechanism known in the art for reception of such signals. The satellite 105 may process the signals received from the gateway terminal 115 and forward the downlink signals 150 to one or more of the user terminals 130. The signals may be passed through a transmit reflector antenna (e.g., a phased array antenna) to form the transmission radiation pattern (spot beam). The satellite 105 may operate in a multiple spot-beam mode, transmitting a number of narrow beams each directed at a different region of the earth. This allows segregation of the user terminals 130 into the various narrow beams.

The satellite 105 may be configured as a "bent pipe" satellite. In this configuration, the satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by the satellite 105 (e.g., adaptive coding and modulation).

The satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The segments may be connected via a mesh network, a star network, or the like as would be evident to those skilled in the art.

The forward downlink signals 150 may be transmitted from the satellite 105 to one or more user terminals 130. The user terminals 130 may receive the downlink signals 150 using an antenna 127. In one embodiment, the antenna 127 and the user terminal 130 together comprise a very small aperture terminal (VSAT), with the antenna 127 measuring approximately 0.6 meters in diameter and having approximately 2 watts of power. In other embodiments, a variety of other types of antennas 127 may be used at the user terminals 130 to receive the downlink signals 150 from the satellite 105. Each of the user terminals 130 may comprise a single user terminal or, alternatively, may comprise a hub or router (not pictured) that is coupled to multiple user terminals. Each user terminal 130 may be connected to various consumer premises equipment (CPE) comprising, for example, computers, local area networks, internet appliances, wireless networks, and the like.

In a manner similar to that described above, the user terminals 130 may use return link transmissions to communicate with the gateway terminal 115 or the network 120 via the satellite 105. The return link may consist of return uplink transmissions 145 from the user terminals 130 to the satellite 105, and return downlink transmissions 140 from the satellite 105 to the gateway terminal 115. The gateway terminal 115 may format the received signals for transmission to one or more destinations that are accessible via the network 120.

The techniques described below for distributing FEC decoders among decoder queues for codewords of different block sizes can be applied to satellite communications systems such as the satellite communications system 100 of FIG. 1. In particular, a bank of decoders at a gateway of the satellite communications system can be shared across multiple return link channels, allowing the system to take advantage of statistical multiplexing. Because each decoder is occupied for a random period, sharing the decoders across the pool of channels reduces overall delay.

The disclosed techniques generally involve dividing the total available number of decoders, $N_{dec}$, into K groups, where K is the number of different sizes of codewords in the system. The total available number of decoders is divided such that the number of decoders dedicated to decoding codewords of a particular size is proportional to a current offered load of codewords of the particular size. This statistical multiplexing results in better overall utilization of the decoders and provides jitter management by reducing variation in decoding delay. Details of these techniques are provided below.

Sharing Decoding Resources Across Multiple Return Link Channels

In an exemplary TDMA (or MF-TDMA) system, each Media Access Control layer (MAC) processing subsystem and/or PHY processing subsystem at the gateway is responsible for processing a fixed amount of bandwidth (e.g., 125 MHz). This quantity of bandwidth could be divided into multiple return link channels, where each channel can be much smaller than 125 MHz. In one embodiment, each return link channel is 625 ksps, and thus the MAC/PHY processing subsystem at the gateway needs to process 200 return link channels. Alternatively, the return link channels could be of different symbol rates. For example, there could be a mixture of 625 ksps, 1.25 Msps, 2.5 Msps, 5 Msps, 10 Msps, and 20 Msps return link channels, such that the amount being processed by this subsystem sums to the total bandwidth (e.g., 125 MHz).

Figure 2:
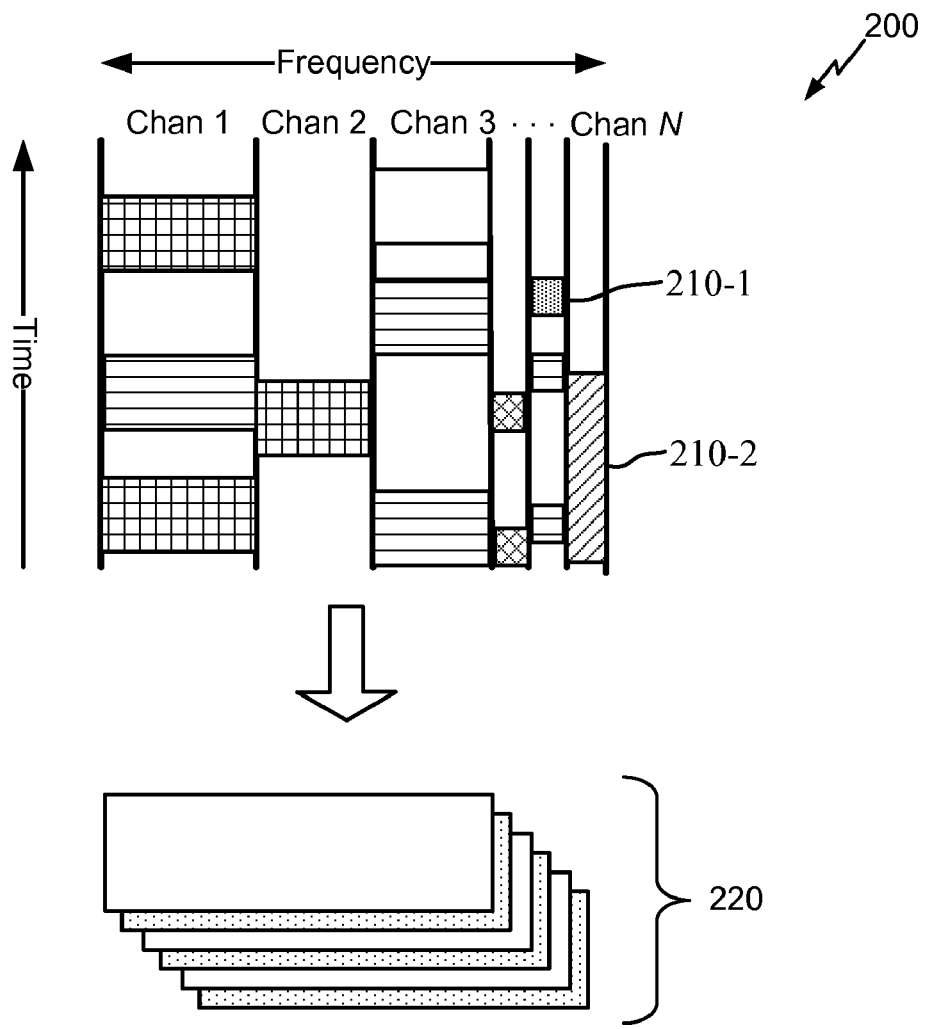
FIG. 2 shows a bank of receivers servicing multiple return link channels.

Each return link channel receives bursts from one or more user terminals (e.g., user terminals 130 of FIG. 1). FIG. 2 shows an example 200 of a bank of receivers 220 at a gateway servicing multiple return link channels. The bursts 210 transmitted on the return link channels from different user terminals are indicated by the different patterns. Each burst 210 can contain one or more codewords. Each decoder takes a random amount of time to finish decoding each codeword, because decoding time depends on codeword size as well as the number of iterations taken to decode a particular codeword. Thus, the ability to pool the decoding resources of the bank of receivers across multiple return link channels is an example of statistical multiplexing.

In one example, there are two return link channels: channel 1 and channel 2. If the return link channels had dedicated decoders that could not be shared, as in conventional systems, then a codeword in channel 1 would have to wait for the decoder dedicated to channel 1 to be available before the codeword in channel 1 could be decoded. This would be the case even if the decoder dedicated to channel 2 was idle and available. In contrast, if all the decoders could be shared, then the codeword in channel 1 could be decoded by the idle decoder, thus leading to lower decoding latencies.

Figure 3:
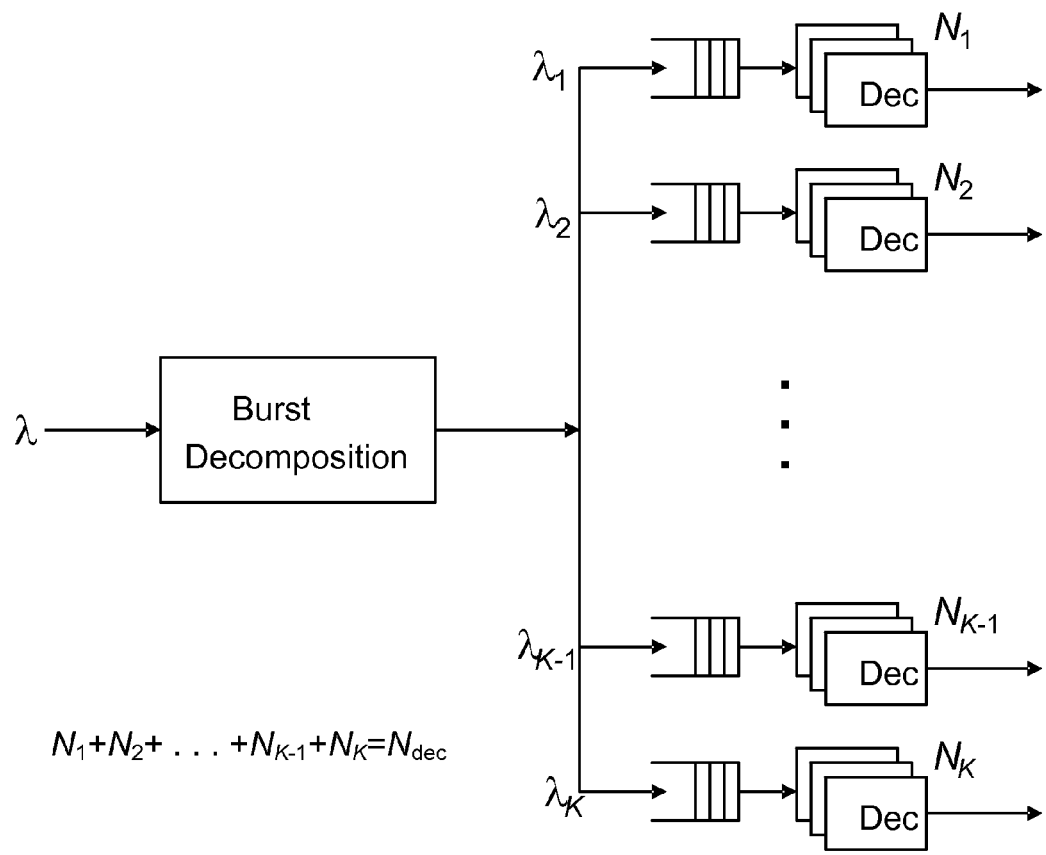
FIG. 3 shows a bank of decoders with a single decoder queue for each FEC block size.

Distributing Decoders Among Decoder Queues for Codewords of Different Block Sizes For the techniques of distributing a total number of decoders among decoder queues, the gateway of the satellite communications system can be presumed to have a fixed number of decoders, $N_{dec}$. A fixed number of different codeword sizes, K, can also be presumed. For example, there may be $N_{dec}$=24 dedicated decoders and K=6 different codeword sizes. The incoming codeword distribution at the gateway may vary over these K different codeword sizes and follow no known a priori pattern. The challenge is to distribute these $N_{dec}$ decoders into $N_1, N_2, \ldots, N_K$ decoders such that $N_{dec}=N_1+N_2+ \ldots +N_K$ and $N_j$ decoders are dedicated to decoding codewords of size j for j∈ of 1, 2, ..., K. This is illustrated in FIG. 3, which shows a bank of decoders with a single decoder queue for each of K FEC block sizes. Each burst received from a user terminal is decomposed into codewords, and each of the codewords is routed to a respective decoder queue based on the block size of the particular codeword.

Figure 4:
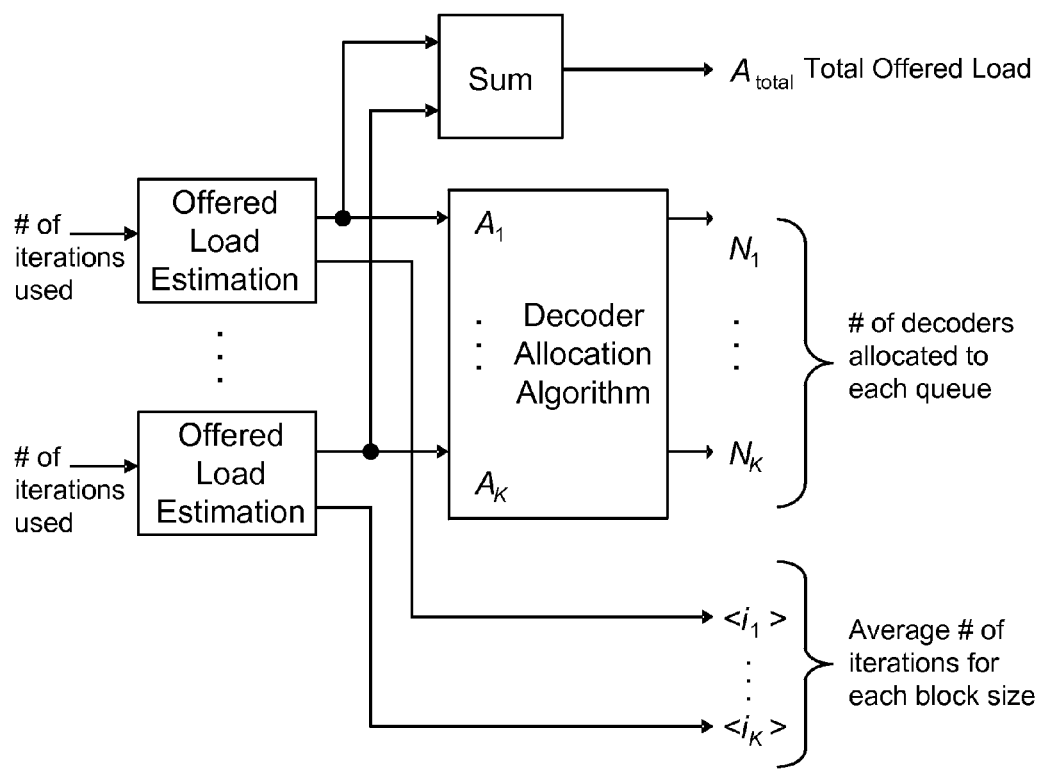
FIG. 4 illustrates allocation of the total number of available decoders among the decoder queues.
Figure 5:
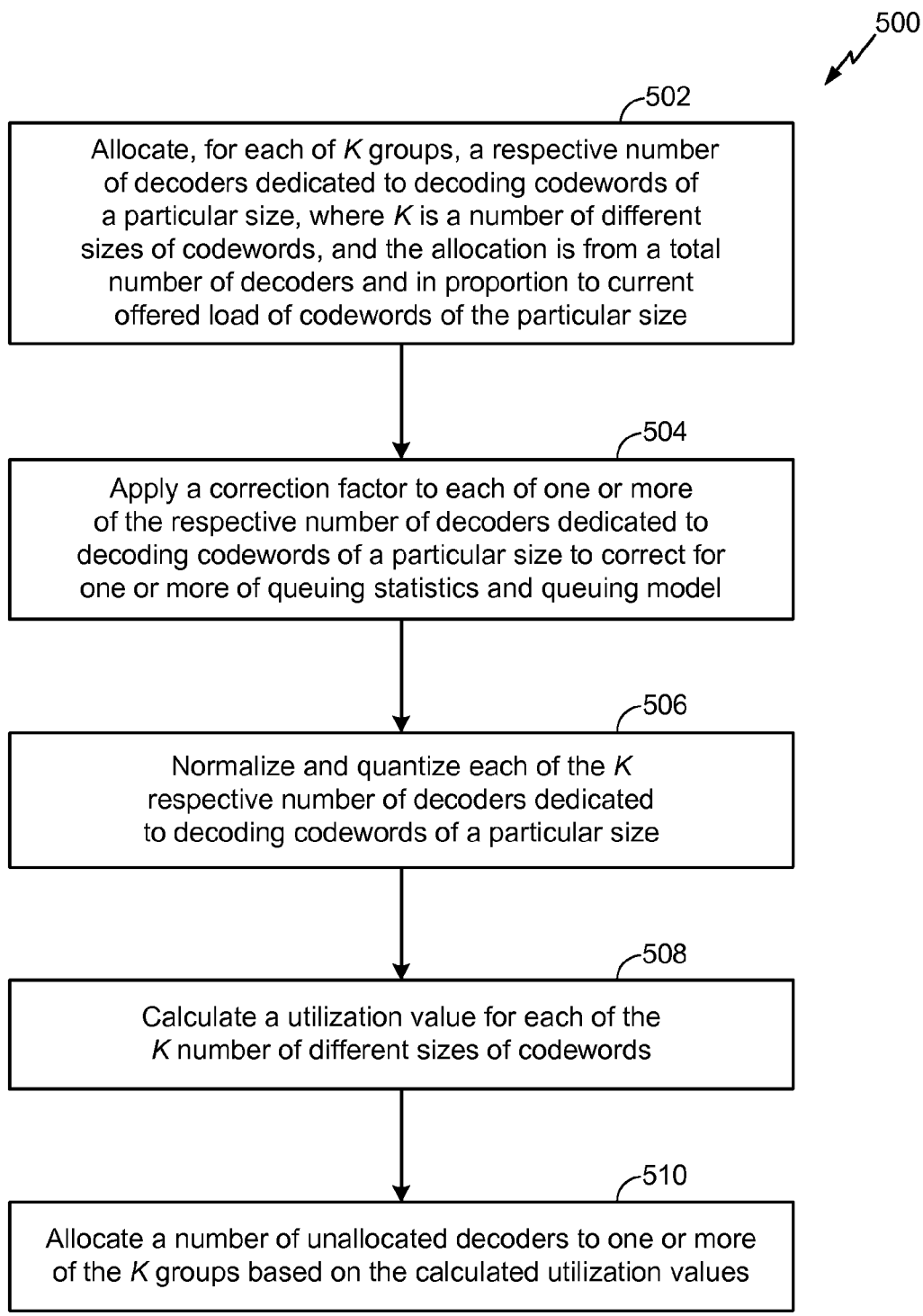
FIG. 5 provides a flow diagram describing methods for dividing a total number of decoders among decoder queues of codewords of different sizes.

Referring to FIG. 5, with further reference to FIG. 4, a process 500 of dividing a total number of decoders among decoder queues of codewords of different sizes includes the stages shown. The codewords are transmitted on return communication links from user terminals to a gateway of a satellite communications system. FIG. 4 illustrates allocation of the total number of available decoders among the decoder queues. The process 500 is, however, exemplary only and not limiting. The process 500 can be altered, e.g., by having stages added, removed, or rearranged.

At stage 502, a processor (e.g., a processor of a MAC/PHY processing subsystem of the gateway) allocates, for each of K groups, a respective number of decoders dedicated to decoding codewords of a particular size, where the respective number of decoders is allocated from the total number of decoders, $N_{dec}$, and allocated in proportion to current offered load of codewords of the particular size. As above, K is the number of different sizes of codewords. For example, if $A_j$ is the current offered load of codewords of size j, the number of decoders dedicated to decoding codewords of size j, $N_j$, can be set to $A_j$ or proportional to $A_j$.

In some implementations, the process 500 includes calculating the respective current offered load for each of the K number of different sizes of codewords. Estimation of offered load for each of the K number of different sizes of codewords is illustrated in FIG. 4, where the offered load, $A_j$, is further used in the decoder allocation algorithm. In one example, the current offered load, $A_j$, for codewords of size j can be calculated as a function of average iteration rate (i.e., $i_j$) for codewords of size j, the number of symbols processed per codeword of size j (i.e., $N_{FEC}$), and the processing rate in symbols per second (i.e., $R_{decoder}$) of the $N_j$ decoders dedicated to decoding codewords of size j. In particular, $A_j$ can equal $i_j * N_{FEC}/R_{decoder}$.

The average iteration rate is the average number of decoder iterations per second. FIG. 4 illustrates that calculation of the average iteration rate, $i_j$, is part of offered load estimation. As an example, average iteration rate can be calculated by counting the total number of decoder iterations over an interval of time T (e.g., T=1.28 seconds), and dividing the total number of decoder iterations by T seconds to get the average number of iterations per second.

In another example with a windowed decoder implementation, the total number of symbols processed per codeword of size j is equal to $N_{FEC}+N_b$, where $N_{FEC}$ is the number of symbols in the codeword of size j excluding ambles, and $N_b$ is the decoder window size. Both $N_{FEC}$ and $N_b$ are generally fixed and known at the time of code design for each burst size and modulation/coding combination. Traffic in a spot beam will generally use the same code rate, and thus, the code rate associated with the spot beam can be presumed for all bursts. Additionally, if inner and outer decoders are used and $R_{decoder}$ is the processing rate of one of these decoders, $R_{decoder}/2$ can be used for the overall processing rate of the concatenated inner and outer decoders. Thus, for this example, the current offered load, $A_j$, in Erlangs for codewords of size j can be calculated as $i_j*2*(N_{FEC}+N_b)/R_{decoder}$.

In some implementations, the process 500 includes allocating a minimum number of decoders to each of the K groups, where each of the respective number of decoders dedicated to decoding codewords of a particular size is greater than or equal to the minimum number of decoders allocated to each of the K groups. For example, the minimum number of decoders, $N_{min}$, allocated to each of the K groups can be set to a small number (e.g., 1) relative to the total number of decoders available. This is to account for the statistical chance, however small, that a codeword of a particular size is received at the gateway.

Returning to FIG. 5, at stage 504, the processor applies a correction factor to each of one or more of the respective number of decoders dedicated to decoding codewords of a particular size to correct for one or more of queuing statistics and queuing model. For example, to correct for queuing statistics to account for fluctuations over the current offered load, the number of decoders dedicated to decoding codewords of a particular size can be incremented for one or more (e.g., all) of the K number of decoders (i.e., $N_j=N_j+1$). This example correction acts as a rounding function. In another example, to correct for deviations in the queuing model (e.g., an M/M/k model), the number of decoders dedicated to decoding codewords of a particular size can be multiplied by a correction function (e.g., $N_j=N_j*f(K)$).

At stage 506, the processor normalizes and quantizes each of the K respective number of decoders dedicated to decoding codewords of a particular size. For example, the number of decoders, $N_j$, dedicated to decoding codewords of a size j can be set to the following:

$$N_j = N_{min} + \text{Int}\left[(N_{dec} - 6N_{min}) \cdot \left(N_j \Big/ \sum_{i=1}^{6} N_i\right)\right].$$

After the normalizing and quantizing, the total number of decoders may not be allocated among the K decoder queues, i.e., $N_1+N_2+\ldots+N_K<N_{dec}$. If this is the case, the process 500 can continue on to stages 508 and 510.

At stage 508, the processor calculates a utilization value for each of the K number of different sizes of codewords. For example, the utilization value, $U_j$, for codewords of size j can be set to the current offered load, $A_j$, for codewords of size j divided by the number of decoders, $N_j$, dedicated to decoding codewords of size j. That is, $U_j=A_j/N_j$.

At stage 510, the processor allocates a number of unallocated decoders to one or more of the K groups based on the calculated utilization values. That is, if $N_1+N_2+\ldots+N_K<N_{dec}$ after stage 506, the number of unallocated decoders remaining is $N_{rem}=N_{dec}-(N_1+N_2+\ldots+N_K)$. These remaining unallocated decoders can be allocated to one or more of the K decoding queues, for example, on a highest utilization first basis. Two techniques are described below for allocating the remaining decoders to one or more of the K decoding queues, although other techniques are possible.

In some implementations, the remaining unallocated decoders are all allocated to the decoder queue associated with codewords of size j, where $U_j$ is the highest of the K utilization values calculated at stage 508. That is, $N_j=N_j+N_{rem}$.

In other implementations, one of the remaining unallocated decoders is allocated to the decoder queue associated with codewords of size j, where $U_j$ is the highest of the K utilization values calculated at stage 508. That is, $N_j=N_j+1$, and $N_{rem}=N_{rem}-1$. Stages 508 and 510 can then be repeated, allocating with each iteration one of the remaining unallocated decoder to the decoder queue associated with the codeword size of presently calculated highest utilization (i.e., as calculated at stage 508) until there are no remaining unallocated decoders (i.e., $N_{rem}=0$). Upon the last iteration, $N_1+N_2+\ldots+N_K=N_{dec}$.

Decoding Codewords of Different Block Sizes Using the Decoder Queues

In the satellite communications system, a C-bit (e.g., C=16) cyclic redundancy check (CRC) may be appended at the end of each codeword after the FEC encoding process is complete at the physical layer of a transmitter at a user terminal (e.g., one of the user terminals 130 of FIG. 1). The CRC covers the entire FEC codeword. At the decoder side on the receiving end (i.e., at the gateway), the decoder tries to match the CRC (i.e., check that the CRC passes) at the end of each decoding iteration. If the CRC does match, it could be a false alarm. Thus, in some implementations, the decoder tries to verify the CRC match by iterating one or more times and checking for some threshold number of consecutive CRC matches (e.g., 2). If the threshold number of consecutive CRC matches is reached, the decoder can declare that the codeword is decoded correctly and can send the decoded symbols up to the next higher layer while starting to process the next burst in the decoding queue.

If the CRC does not match at the end of an iteration, the decoder iterates and checks the CRC again at the end of each iteration until either the CRC matches (i.e., passes) for the threshold number of consecutive iterations, or the number of decoding iterations reaches a maximum number of iterations (e.g., 100). The threshold number of consecutive iterations is used to reduce the probably of a false alarm of correct codeword decoding.

In some implementations, codewords of different sizes can have appended CRCs of different sizes. Since CRCs utilize physical layer overhead, a fixed size CRC has a disproportionately higher overhead, expressed as a fraction of the burst size, for shorter burst sizes than the overhead utilized by the fixed size CRC for longer burst sizes. However, short CRCs have a higher probability of false alarm than the probability of false alarm of longer CRCs. Thus, a short CRC can be used with a higher threshold number of consecutive CRC matches in order to keep the overhead low. That is, in some implementations, each codeword of a different size has a different length for its CRC and a different threshold number of consecutive CRC matches. Similarly, the stopping criterion of a maximum number of iterations can also be a function of the codeword size.

In some satellite communications systems, a return link scheduler at the gateway is responsible for scheduling timeslots for the various user terminals to transmit. This is typical in most TDMA systems. There are numerous schedulers that may be used, and some schedulers are more efficient than other schedulers. Other than schedulers that are 100% efficient, most schedulers will schedule timeslots in excess of what a particular user terminal needs. Thus, user terminals can be assigned timeslots that the user terminal does not need and can ignore. In power-limited user terminals, it is optimal to save power and not transmit any bursts when there is no data to transmit during an assigned timeslot. However, most satellite broadband systems are not power-limited, as user terminals are typically powered by wall outlets.

When the user terminals are not power-limited, it can be preferable to transmit a burst whenever an assigned timeslot is scheduled for that user terminal. If nothing is transmitted by the user terminal during an assigned timeslot (i.e., no codewords and no corresponding CRCs are transmitted), the decoder tries to decode noise as a non-existent codeword, and thus, the CRC will not pass for the threshold number of consecutive iterations. Consequently, the decoder will need to run up to the maximum number of iterations before it can move on to the next burst, increasing the latency seen by codewords of the next burst. An alternative would be to first detect the presence of a burst and then to try to do burst decoding. However, burst detection in the low signal-to-noise ratio (SNR) conditions typically seen in satellite communications systems requires a relatively long amble structure, which is an efficient use of limited bandwidth.

Thus, in some implementations, a user terminal that is not power-limited and has no data to send will transmit a burst (e.g., a burst of valid codewords with all 0s information bits) whenever a timeslot is scheduled for that user terminal by the return link scheduler of the gateway. Transmitting a dummy burst when the user terminal has no data to send ensures that all scheduled timeslots will have bursts, thus preventing the decoder from needing to run the maximum number of iterations needlessly.

Figure 6:
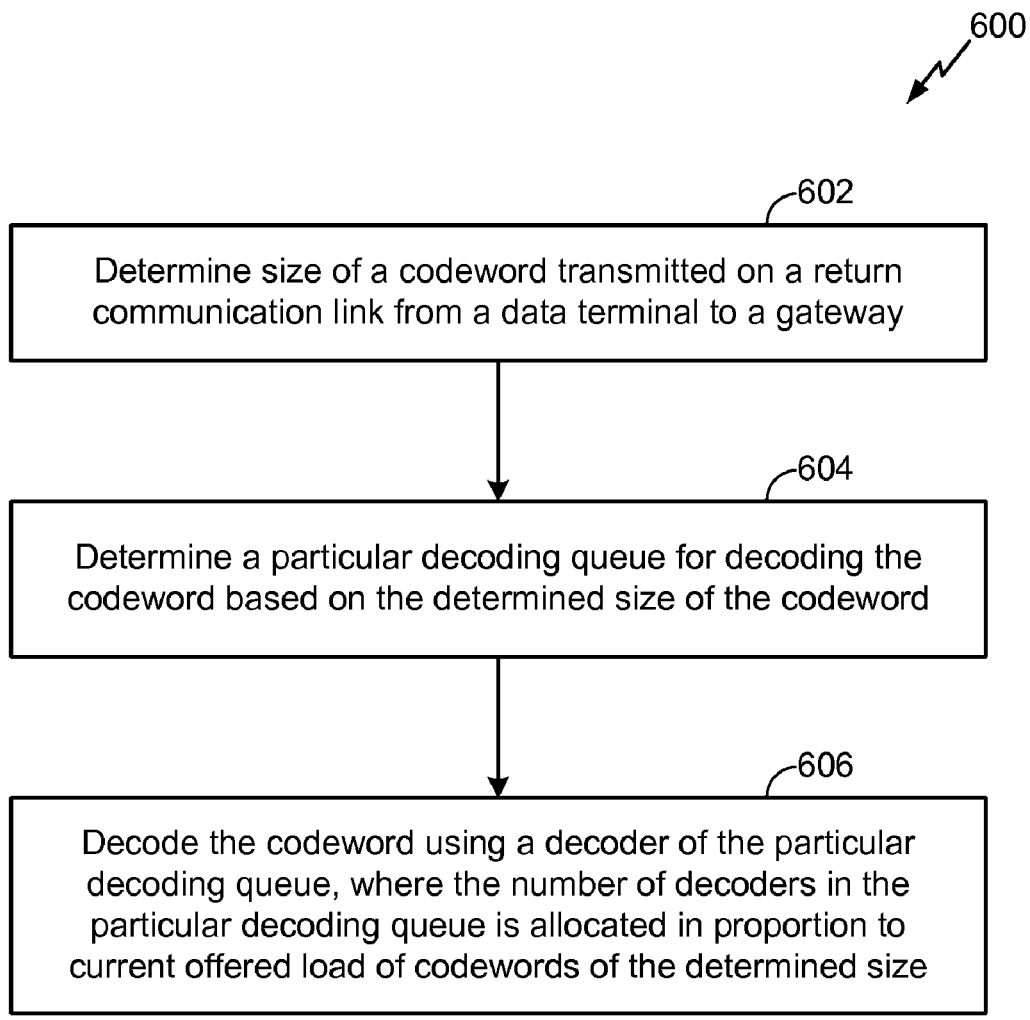
FIG. 6 provides a flow diagram describing methods for decoding codewords of different sizes.

Referring to FIG. 6, a process 600 of decoding codewords of different sizes includes the stages shown. The codewords are transmitted on return communication links from user terminals to a gateway of a satellite communications system. The process 600 is, however, exemplary only and not limiting. The process 600 can be altered, e.g., by having stages added, removed, or rearranged.

At stage 602, a processor (e.g., a processor of the gateway 115 of FIG. 1) determines the size of a codeword transmitted from a user terminal. The processor can determine that the codeword included in a burst from the user terminal has one of K codeword sizes.

At stage 604, the processor determines a particular decoding queue for decoding the codeword based on the determined size of the codeword, where the particular decoding queue is one of K decoding queues.

At stage 606, a decoder of the particular decoding queue decodes the codeword, where the number of decoders in the particular decoding queue is allocated in proportion to current offered load of codewords of the determined size. For example, the number of decoders in the particular decoding queue can be allocated using the process 500 described above in FIG. 5.

It should be noted that the methods and systems discussed throughout the specification are provided merely as examples. Various embodiments may omit, substitute, or add various procedures or components as appropriate. For instance, it should be appreciated that features described with respect to certain embodiments may be combined in various other embodiments. Also, measurements can be made and the various values provided in any units. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for dividing a total number of decoders among decoder queues of codewords of different sizes, the codewords transmitted on return communication links from data terminals to a gateway of a satellite communications system, the method comprising:

for each of K groups, allocating a respective number of decoders dedicated to decoding codewords of a particular size, where K is a number of different sizes of codewords, and the respective number of decoders is allocated from the total number of decoders and allocated in proportion to current offered load of codewords of the particular size.

2. The method of claim 1, further comprising allocating a minimum number of decoders to each of the K groups, where each of the respective number of decoders dedicated to decoding codewords of a particular size is greater than or equal to the minimum number of decoders allocated to each of the K groups.

3. The method of claim 1, further comprising calculating the respective current offered load for each of the K number of different sizes of codewords.

4. The method of claim 3, where calculating the respective current offered load of codewords of a particular size comprises calculating the respective current offered load as a function of average iteration rate for codewords of the particular size, number of symbols processed per codeword of the particular size, and processing rate of the decoders dedicated to decoding codewords of the particular size.

5. The method of claim 1, further comprising applying a correction factor to each of one or more of the respective number of decoders dedicated to decoding codewords of a particular size to correct for one or more of queuing statistics and queuing model.

6. The method of claim 1, further comprising normalizing and quantizing each of the K respective number of decoders dedicated to decoding codewords of a particular size.

7. The method of claim 1, further comprising:
calculating a utilization value for each of the K number of different sizes of codewords; and
allocating a number of unallocated decoders to one or more of the K groups based on the calculated utilization values.

8. A method for decoding codewords of different sizes, the codewords transmitted on return communication links from data terminals to a gateway of a satellite communications system, the method comprising:
determining a size of a codeword;
determining a particular decoding queue for decoding the codeword based on the determined size of the codeword, the particular decoding queue being one of K decoding queues, where K is a number of different sizes of codewords; and
decoding the codeword using a decoder of the particular decoding queue, where the number of decoders in the particular decoding queue is allocated in proportion to current offered load of codewords of the determined size.

9. The method of claim 8, where decoding the codeword comprises iteratively decoding the codeword including determining after each decoding iteration if a cyclic redundancy check associated with the codeword passes.

10. The method of claim 9, where iteratively decoding the codeword comprises iteratively decoding the codeword until a maximum number of iterations is reached or the cyclic redundancy check associated with the codeword passes for a threshold number of consecutive iterations.

11. The method of claim 10, where one or more of the following varies based on the determined size of the codeword: a size of the cyclic redundancy check associated with the codeword, the maximum number of iterations, and the threshold number of consecutive iterations.

12. The method of claim 8, further comprising detecting presence of a data burst during a transmission time assigned to a data terminal of the satellite communications system, where determining the size of the codeword comprises determining the size of the codeword included in the data burst.

13. The method of claim 12, further comprising determining that the data burst is a dummy burst transmitted by the data terminal during the assigned transmission time, where the dummy burst does not include codewords.

14. An apparatus for dividing a total number of decoders among decoder queues of codewords of different sizes, the codewords transmitted on return communication links from data terminals to a gateway of a satellite communications system, the apparatus comprising:
a processor configured to allocate, for each of K groups, a respective number of decoders dedicated to decoding codewords of a particular size, where K is a number of different sizes of codewords, and the respective number of decoders is allocated from the total number of decoders and allocated in proportion to current offered load of codewords of the particular size.

15. The apparatus of claim 14, wherein the processor is further configured to calculate the respective current offered load for each of the K number of different sizes of codewords.

16. The apparatus of claim 14, wherein the processor is further configured to apply a correction factor to each of one or more of the respective number of decoders dedicated to decoding codewords of a particular size to correct for one or more of queuing statistics and queuing model.

17. The apparatus of claim 14, wherein the processor is further configured to normalize and quantize each of the K respective number of decoders dedicated to decoding codewords of a particular size.

18. The apparatus of claim 14, wherein the processor is further configured to:
calculate a utilization value for each of the K number of different sizes of codewords; and
allocate a number of unallocated decoders to one or more of the K groups based on the calculated utilization values.

19. An apparatus for decoding codewords of different sizes, the codewords transmitted on return communication links from data terminals to a gateway of a satellite communications system, the apparatus comprising:
a processor configured to determine a size of a codeword, and determine a particular decoding queue for decoding the codeword based on the determined size of the codeword, the particular decoding queue being one of K decoding queues, where K is a number of different sizes of codewords; and
a number of decoders in the particular decoding queue, each decoder communicatively coupled to the processor and configured to decode the codeword, where the number of decoders in the particular decoding queue is allocated in proportion to current offered load of codewords of the determined size.

20. The apparatus of claim 19, where each of the decoders is configured to iteratively decode the codeword including determining after each decoding iteration if a cyclic redundancy check associated with the codeword passes.

21. The apparatus of claim 20, where each of the decoders is configured to iteratively decode the codeword until a maximum number of iterations is reached or the cyclic redundancy check associated with the codeword passes for a threshold number of consecutive iterations.

22. The apparatus of claim 21, where one or more of the following varies based on the determined size of the codeword: a size of the cyclic redundancy check associated with the codeword, the maximum number of iterations, and the threshold number of consecutive iterations.

* * * * *